United States Patent [19]

Shea et al.

[11] Patent Number: 5,505,497

[45] Date of Patent: Apr. 9, 1996

[54] MECHANICAL JOINT CONNECTIONS FOR FIBERGLASS REINFORCED DUCT SECTIONS

[76] Inventors: Lawrence E. Shea, 165 Lake Dr., San Bruno, Calif. 94066; John J. Shea, 708 Vermont St., San Francisco, Calif. 94107

[21] Appl. No.: 152,470

[22] Filed: Nov. 15, 1993

[51] Int. Cl.⁶ ........................................ F16L 9/14
[52] U.S. Cl. .................... 285/55; 285/291; 285/915; 285/331; 285/373; 277/205; 24/271
[58] Field of Search ........................... 285/331, 915, 285/373, 291, 295, 55; 277/205, 206 A, 101; 24/271, 274 R, 279

[56] References Cited

U.S. PATENT DOCUMENTS

| | | | |
|---|---|---|---|
| 3,686,747 | 8/1972 | Bagnulo | 285/915 X |
| 3,725,105 | 4/1973 | Chase | 117/2 R |
| 3,851,901 | 12/1974 | Sills | 285/112 |
| 4,043,574 | 8/1977 | Asano | 285/915 X |
| 4,155,574 | 5/1979 | Hulsey | 285/373 X |
| 4,518,177 | 5/1985 | Deakins | 285/373 X |
| 4,538,837 | 9/1985 | Cronk | 285/331 X |
| 4,538,839 | 9/1985 | Ledgerwood | 285/373 X |
| 4,643,461 | 2/1987 | Thau, Jr. et al. | 285/373 X |
| 4,702,500 | 10/1987 | Thau, Jr. et al. | 285/373 X |
| 4,928,998 | 5/1990 | Brandener | 285/49 |
| 5,039,137 | 8/1991 | Cankovic et al. | 285/331 X |
| 5,180,193 | 1/1993 | Rung et al. | 285/112 |
| 5,329,673 | 7/1994 | Mason | 24/271 |

*Primary Examiner*—Dave W. Arola
*Assistant Examiner*—Heather Chun Shackelford
*Attorney, Agent, or Firm*—Owen, Wickersham & Erickson

[57] ABSTRACT

A mechanical coupling device for connecting together two aligned fiberglass reinforced plastic duct sections, each having a terminal end portion of equal diameter, so as to form a leak proof joint that is resistant to fire and also chemical corrosion from gases and/or condensate within the duct sections is disclosed. The device comprises elements that cover and seal the terminal end portion of each said duct section; a central gasket member that covers the end elements and extends around the terminal end portions of the duct sections; a flexible metal sleeve member that surrounds the central gasket member; and tightening devices on the sleeve which compress the central gasket member and hold the aligned adjoining duct sections together to provide a leak-proof joint. The tightening devices are spring driven so that if the bulk of the gasket member is reduced due to fire, the sleeve will maintain a firm non-slip hold on the duct joint. Different embodiments of the coupling device are disclosed using various configurations of the central gasket member and end elements as well as the use of intumescent materials in the gasket member or in a separate bag. The intumescent materials react to fire which may occur in the duct by swelling to further help the coupling device in maintaining a firm non-slip position on the duct joint during such fire conditions.

18 Claims, 7 Drawing Sheets

MECHANICAL JOINT CONNECTIONS FOR FIBERGLASS REINFORCED DUCT SECTIONS

This invention relates to field joint connections or couplings for fiberglass reinforced plastic duct sections and fittings, and also to methods for making such field joint connections.

BACKGROUND OF THE INVENTION

Fiberglass reinforced plastic (FRP) ductwork is used extensively for fume exhaust of corrosive vapors in such industries as the semiconductor, pharmaceutical, waste water treatment plants, paper and pulp mills, college science buildings and plating shops. These ducts operate at pressures that are most often negative to atmosphere and must be joined in such a manner as to prevent leakage of air from the outside into the duct in order to prevent the waste of energy. In addition, such ducts are widely employed in industries where highly corrosive chemicals are used to process materials, and the interior of the duct is exposed to these harsh chemicals. Often such processes involve high humidities, and when acid or caustic-laden exhaust air enters the exhaust ductwork, a chilling factor occurs, and much condensate can accumulate on the interior of the duct. This condensate tends to puddle in the bottom of the duct and the chemicals in the condensate attack the joints used to connect duct sections to each other or to fittings. Such field joints are highly vulnerable to attack by these aggressive chemicals and can frequently cause failures in duct systems.

Heretofore, a number of different types of joints were used to make the field connections for FRP ductwork. Flanged duct sections have been used, but these require relatively precise dimensioning of product so that what is produced in a fiberglass manufacturer's shop will assemble properly in the field. Any errors in dimensioning of parts could cause considerable problems at the job site. A second prior method used for making FRP duct joints was a simple butt connection, wherein neither flanges or bells are used. Here, all duct and fittings are the same dimension and are merely butted together. The major advantage of butt joints is that the least care must be exercised in dimensioning products for installation in the field. However, some form of coupling device is necessary to hold adjoining duct sections together. A third method for making joints was to use duct sections with bell and spigot end joint portions wherein an enlarged bell is placed at one end of a duct or fitting, whose other end is a non-enlarged portion (the spigot) that fits into the bell portion of the next adjoining duct or fitting. The latter two joints, the bell and spigot joint, and the butt joint were generally bonded together by means of glass and resin, which provided a chemically made joint. This required that surfaces of the FRP parts be sanded on the exterior of the duct or fitting for a distance of 2" to 6" back from the centerline of the field joint. The reason for this is that almost all resins used to make FRP ducts provide an enamel-like finish which inherently rejects further bonding. Also, resin systems such as polyesters used for ductwork, often require the inclusion of a wax which enables the polyester resin to cure properly. This wax migrates to the exterior surface of the fiberglass product and it is virtually impossible to remove it. Attempts to sand the wax away usually drives it deeper into the product. Heretofore, it was necessary to wet sand or scour the ends of the fiberglass ducts with items such as alcohols or acetones to remove the wax. Once removed, there was still an enamel-like finish to contend with and this could only be removed by use of a grinder or sander at the jobsite. This procedure created several problems. Not only was it labor intensive and costly, but also the sanded FRP particles tended to get into clothes, nostrils, eyes, and ears of workers if unprotected.

In addition to the aforesaid sanding problems, prior procedures for field connections of FRP duct sections required that the same resin used to produce the fiberglass reinforced plastic duct product should also be used in the bonding process in the field. This required that catalysts (Part B) be mixed at the job site with the base resin (Part A). In the case of polyesters, often dangerous materials such as methyl ethyl ketone peroxide are used; in the case of epoxies, aliphatic or aromatic amines (Part B) are used, and in the case of various types of phenols or modified phenols, formaldehyde sources (Part B) must be added. The workmen in the field were required to carefully measure the weight ratios of the resin components (Parts A and B) prior to mixing them, and this created a nuisance factor and was prone to error. Thereafter, glass fabric material were saturated with the mixed resin (Part A & B) and applied in various layers with proper "rollout" between each layer. This rollout was generally done with fiberglass rollers which forced the air out of the glass/resin laminate. When joining sections in the field in this prior art manner, two sections (duct to duct or duct to fitting) were required to be held in close proximity to each other and not permitted to move. This field joint, after the application of the glass and resin, also could not be moved in any way until the resin itself had completed its cure, i.e. hardened.

Those who have worked in the field of FRP ductwork have long sought to develop an effective and efficient method and means for eliminating the above problems and complications of prior field duct connections. In certain industries such as the semiconductor or pharmaceutical industry, ductwork is generally installed in areas that are super clean, known as clean rooms. In these industries, great concern is made about even very small particles such as two to five microns in size, which are considered to be very large contaminates in the semiconductor industry. Construction of these types of facilities (semiconductor, pharmaceutical) often consists of installing miles of fiberglass reinforced plastic duct for the main ducts. Fiberglass reinforced plastics is a preferred material because of its chemical resistance and comparative low cost. However, building and fire codes often require that this non-metallic ductwork be "fire resistant" as well as corrosion resistant, and the duct joints made in the field at the time of installation must have comparable fire resistance to the ductwork itself. Thus, another stringent requirement for FRP ductwork connections is that they maintain a high fire-resistant quality.

With previous attempts to provide FRP duct coupling devices another serious problem arose involving the use of gasketing elements that were necessary to provide leak-proof connections. When conventional off-the-shelf non-fire retardant plasticized gasketing material was used, the high heat of a typical duct fire caused commonly compounded gasket materials to melt and become liquid, thereby functioning as a lubricant. When this occurred the resulting lubrication effect and also the reduction in or shrinking of the overall duct structure due to the intense heat caused duct sections to slide apart. Thus, such prior art duct coupling structures failed to pass such functional tests as the Factory Mutual Test. This problem has been solved by the present invention which provides duct coupling devices that maintain a high degree of structural integrity even under severe duct fire conditions.

In view of the foregoing, it is therefore one object of the present invention to provide a novel method of making field joints, i.e., duct connections or duct to fitting connections in FRP duct systems which eliminates the necessity of sanding, the used of glass mat or the use of odor causing resins within the clean room facilities presented herein.

Another object of the invention is to provide connection means for duct sections or duct sections and fittings that have a high degree of fire resistance when tested under accepted industry standards.

Another object of the invention is to provide a coupling assembly for connecting abutting duct sections that is leak-proof, strong and durable and which will maintain a high degree of structural integrity even under severe internal duct fire conditions.

Still another object of the invention is to provide a mechanical device for connecting FRP duct sections which is easy to install at the job-site with relatively unskilled labor and without special tools and yet which is leak-proof, long lasting and resistant to chemical corrosion.

A more specific object of the invention is to provide a coupling of abutting FRP duct section having an outer band that will automatically tighten around the duct point if the diameter of the joint should decrease due to shrinkage of the coupling gasket during a fire.

Another object of the invention is to provide an FRP duct coupling having gasket components which will swell and increase in volume in response to increased temperature during an internal duct fire so as to help maintain the coupling firmly in place on the duct joint.

SUMMARY OF THE INVENTION

In accordance with the principles of the invention a duct connecting joint device comprises in combination: protective end members that cover the end edges of each adjoining duct section; a flexible central gasket member of fire resistant material that extends around and covers both end members on adjoining duct sections; a metal sleeve that extends around the central gasket member on the adjoining duct sections; and means for tightening the metal sleeve and holding it in place around the adjoining duct sections. The latter tightening means may be metal straps attached to constant torque or self tightening take-up means which enable the straps to constrict the metal sleeve and hold it in place or spring loaded bolts which function to draw end flanges of the sleeve together. After initial installation, the take-up means will function thereafter to maintain the sleeve firmly on the duct joint even if its diameter should decrease during a fire.

In one embodiment, the protective end members are preformed with a U-shaped cross-section so that they will fit snugly around the end edge of each adjoining duct section. These end members are preferably bonded in place using a special novalak sealing resin. In an alternate arrangement the end edges including inside and outside surfaces of each adjoining duct section are coated with one or more layers of the special novalak resin material The central gasket can be provided in various forms as either a simple continuous ring of flexible material of uniform width and thickness, or in combination with a pair of elastomeric space members which are between the metal sleeve and the outer duct surface, or in the form of "T" or "I" shaped members that fit between and over end portions of adjoining duct sections.

In other embodiments of the invention, the central gasket is made from an intumescent material that reacts to elevated temperatures by swelling in volume. This provides a synergistic action in combination with the self-tightening take-up means for the outer sleeve which maintains structural integrity of the duct connections and prevents separation or slippage of the duct sections during duct fire conditions.

Other objects, advantages and features of the invention will become apparent from the following detailed description of preferred embodiments presented in conjunction with the accompanying drawing.

DETAILED DESCRIPTION OF EMBODIMENTS

Figure 1:
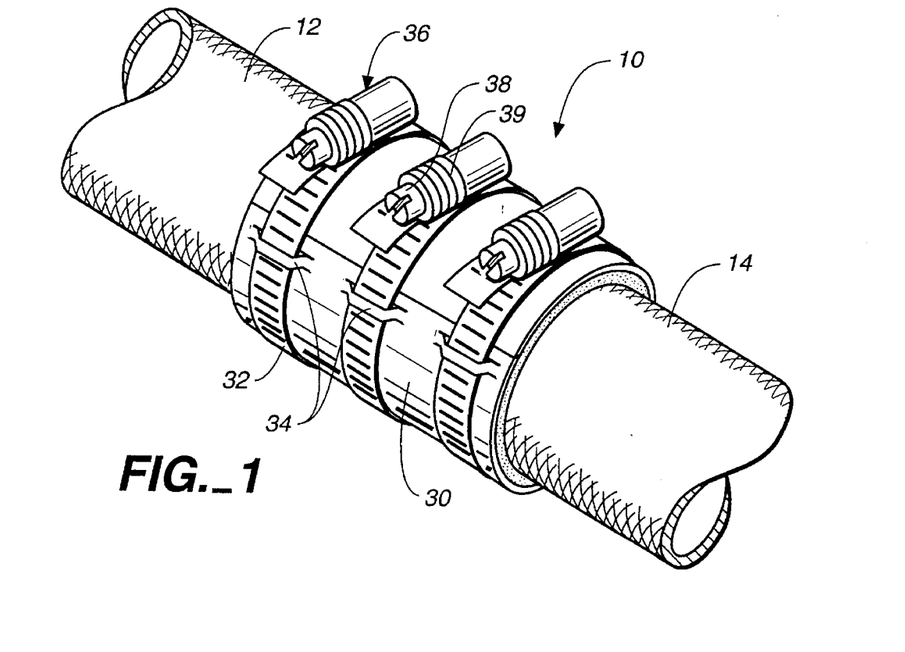
FIG. 1 is a view in perspective of a mechanical joint for connecting a pair of FRP duct sections embodying principles of the present invention.
Figure 2:
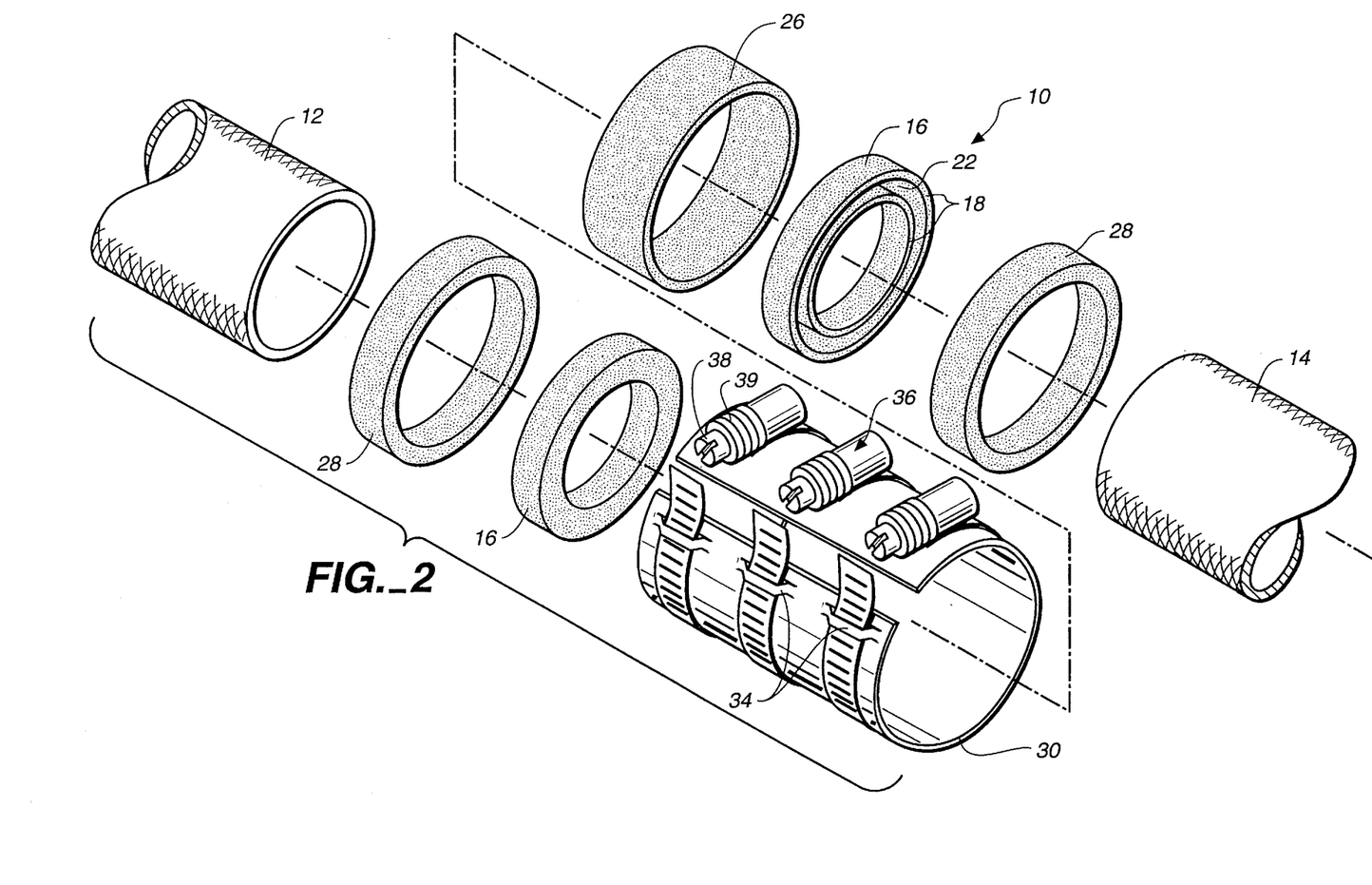
FIG. 2 is an exploded view in perspective of the mechanical joint shown in FIG. 1.

With reference to the drawing, FIG. 1 shows a mechanical joint or coupling 10 embodying principles of the present invention, as it appears when installed for connecting two aligned and adjoining fiberglass reinforced plastic (FRP) duct sections 12 and 14. In FIG. 2 the same mechanical joint 10 is shown in an exploded view so that all of its elements are visible, and in FIG. 3, an enlarged cross section of the joint is shown.

Figure 3:
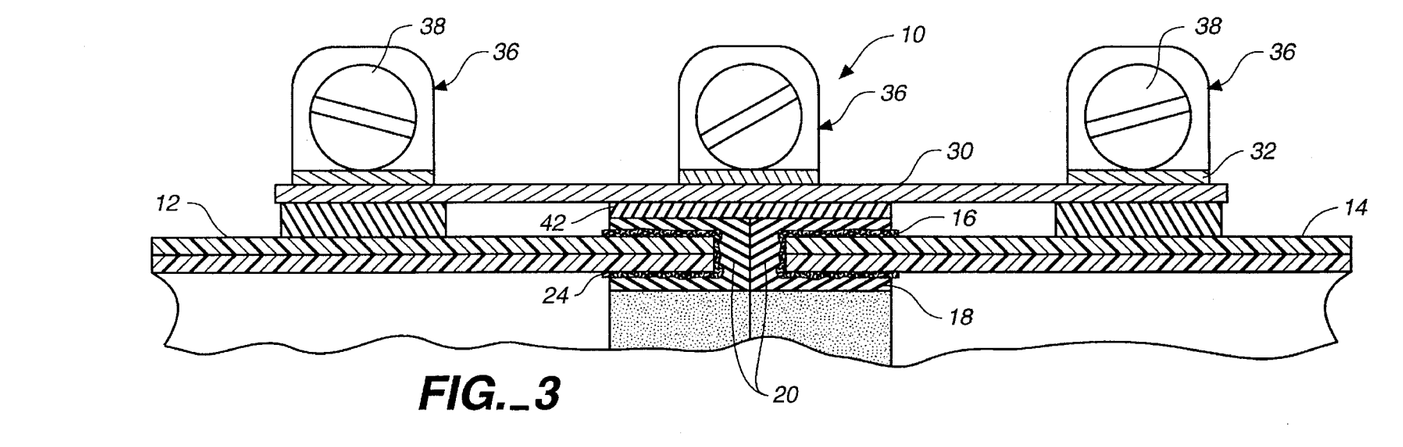
FIG. 3 is an enlarged, fragmentary view in section showing a portion of the assembled mechanical joint of FIGS. 1 and 2.

In general, the joint 10 comprises a pair of circular end gasket members 16 which are preformed from a suitable flexible material such as rubber or plastic. Each gasket member 16 has a channel shaped cross section formed by a pair of spaced apart flanges 18 and a connecting web portion 20 that forms a space 22 between the flanges which is only slightly larger than the thickness of the duct sections 12 and 14. Thus, each end gasket member 16 can fit over the end of a duct section and thereby cover the end surfaces of the duct section and prevent their exposure to corrosive or chemically active condensates in the duct.

Each end gasket member 16 is preferably installed on its duct member after the latter has been coated with a special resin 24 such as a novalak resin which serves to hold the gasket member in place and also provide further protection against the migration of deleterious chemical substances into the joint. The special novalak resin 24 may be defined as a high cross-link density ceramic-filled coating which offers superior long-term chemical resistance. Such a coating is commercially available, such as from Superior Environmental Products of Dallas, Tex.

Extending over the adjoining outer flanges of the end gasket members 16 to provide a sealing means for adjoining duct sections is a central, circular gasket member 26. In the embodiment of FIGS. 1–3 this central gasket is made of a suitable rubber like material of a type which is fire resistant and is sized so that it is under some circular tension when installed to cover the adjoining end gasket members. As shown in FIGS. 2 and 3, a pair of circular spacer gaskets 28 of similar material are also used for the joint 10, each one of which is spaced outwardly from the central gasket member 26. Each spacer gasket of rubber like material has a thickness which is substantially equal to the combined thickness of the outer flange of an end gasket 16 and the thickness of the central gasket 26. These spacer gaskets 28 provide outer support for the opposite ends of a wrap around sheet metal sleeve 30 that extends over the central gasket 26. This sleeve may have a thickness of around 0.08 to 0.12 inches so that it is flexible, yet strong and capable of providing a firm clamping pressure on the central and end gasket members.

Extending around the sleeve 30 at spaced apart locations are a plurality of metal straps or bands 32. As shown in FIG. 1, these bands are retained in place on the sleeve by a series of loops 34 which are preferably formed integrally with the sleeve by a punch out process at preselected locations. Each band 32 is provided at one end with a take-up or tightening device 36 which receives and retains the other end of the band and thereby tighten it to construct the sleeve.

The ends of the sleeve 30 overlap, so that as the bands 32 are tightened, the sleeve diameter becomes smaller and compresses the central gasket tightly around the duct joint. As shown, three bands 32 are used for the sleeve 30 in the embodiment of FIGS. 1–3. However, two or more bands can be used for different configurations of joint connectors within the scope of the invention.

The take-up device 36 for each band is preferably a constant torque or a spring loaded clamp device which is commercially available. In general, these constant torque devices have a turning bolt with a head 38 which operates in concert with a spring 39 that provides constant tension to the band assembly. When the joint 10 is installed, an initial band tension is set in such a manner that should the diameter of the duct be reduced for any reason, such as during a duct fire, the spring action in the take-up device 36 automatically tightens the band and squeezes the joint assembly together to maintain the sleeve tightly around the duct joint and thus its structural integrity. The combination of the constant torque clamp or take-up device 36 and also the use of fire retardant, non-shrinking gasketing materials for some installations synergistically provide a joint that will not pull apart even during an intense fire load in the duct.

The installation of the joint connector 10 can be performed easily by a relatively unskilled workman and simple tools and without the necessity to prepare the resin surfaces of the adjoining duct sections by extensive sanding and without the need for applying fiberglass lay-up material with resins as previously used. With the present invention the ends of adjoining duct sections are each covered by an end gasket 16 using a novalak resin adhesive material, as described. The central gasket 26, and spacer gaskets 28 are then positioned with the duct sections in end abutment. Now, the sleeve is wrapped around the duct sections 12 and 14 so that the central and spacer gaskets are covered. The bands 32 are joined together and each take-up device 36 is tightened by turning its head 38 with a simple wrench or screwdriver to produce a constant, desired tension in each band.

Figure 4:
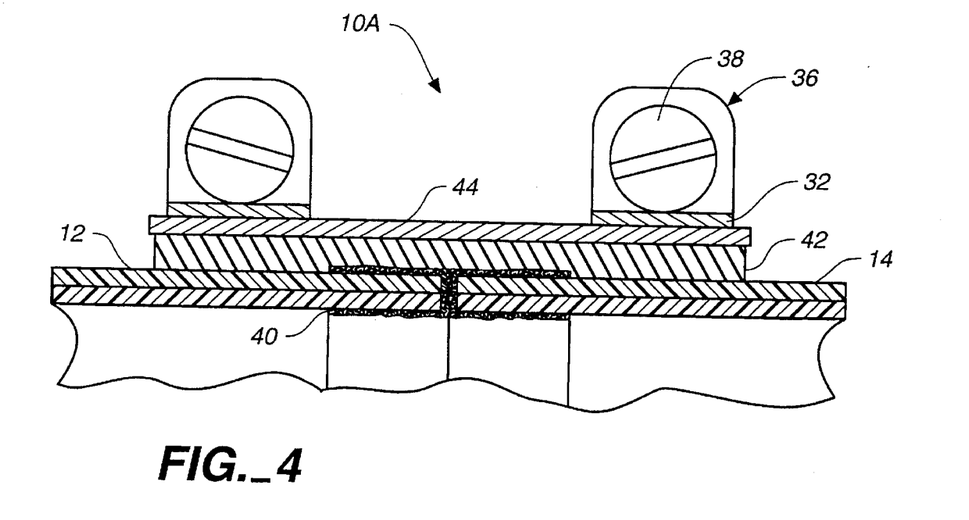
FIG. 4 is a fragmentary view in section showing a modified form of the mechanical joint according to the invention.

In a first modified form of the invention shown in FIG. 4, a joint connector 10A is provided wherein the end gaskets 16 of the previous embodiment are replaced by relatively heavy layer 40 of novalak resin. This may be the same resin material 24 used to hold the end gaskets 16 in place, but here, the novalak resin may be thickened with ceramic powder or glass beads and is applied so that the layer 40 has a substantial thickness (e.g. 0.04 to 0.08 inches) and covers substantially the same area U-shaped on the end portion of each duct section. To achieve the desired thickness for layer 40, the resin may be applied in two or three stages, allowing each stage to at least partially dry before adding the next stage. After the end resin layers 40 have been applied and are dry, a central circular gasket 42 is installed around the abutting duct sections. In this embodiment the gasket 42 has a constant width and thickness. After the gasket 42 is in place, a sleeve 44 with at least 2 bands 32, is installed, each band having a take-up device 36 as previously describe.

Figure 5:
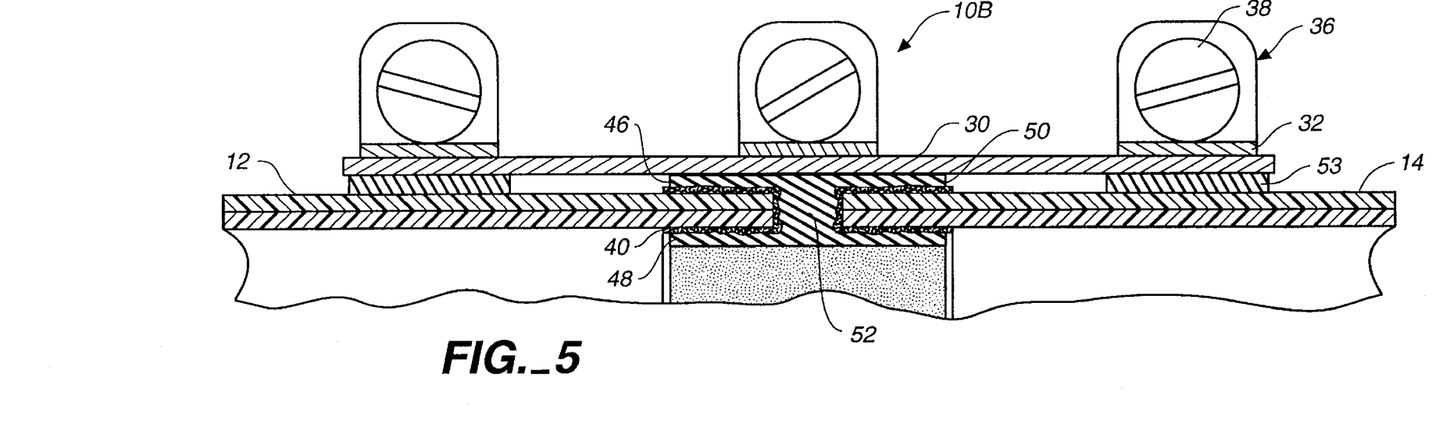
FIG. 5 is a fragmentary view in section showing a further modified form of the invention with an I-shaped gasket member.

In a further embodiment of the invention shown in FIG. 5, another modified joint connector 10B is shown which utilizes a central gasket 46 with an a "T" shape. Here, the end portions of the adjoining duct sections 12 and 14 are each provided with a layer 40 of novalak resin as previously described and shown relative to FIG. 4. The central gasket 46 is an integral circular unit having inner and outer flanges 48 and 50 which extend from opposite sides of a central web portion 52. Again, this gasket is made of a fire resistant rubber like material. The flanges 48 and 50 fit over the end portions of both adjoining duct sections thereby forming a continuous joint section around the junction of the duct sections. A pair of circular spacer gaskets 53 of the type previously described are provided around the duct sections and spaced from opposite ends of the central gasket 46. As with the previous embodiment of FIG. 1, a sleeve 30 with attached bands 32 is wrapped around the central and spacer gaskets and compressive force is applied by a plurality of constant torque take-up devices 36 as shown above.

Figure 6:
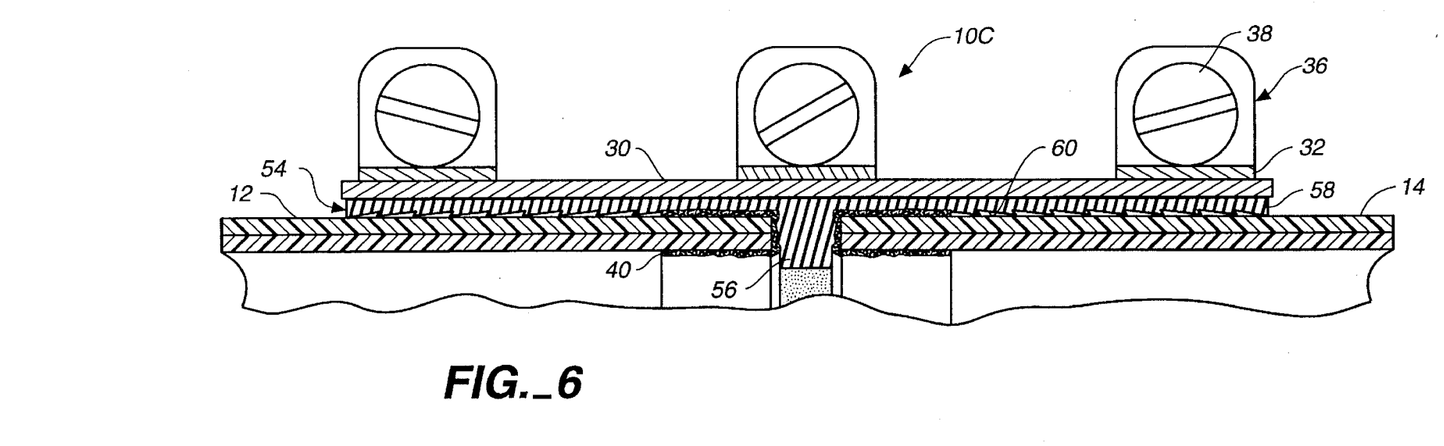
FIG. 6 is a fragmentary view in section showing a further modified form of the invention with a "T"-shaped gasket member.

In yet another modification shown in FIG. 6, joint connector 10C utilizes a central gasket 54 having generally a "T" shape. Here again, the end portions of adjoining duct sections are provided with a novalak resin layer 40 which covers and protects the end surfaces of the two duct sections. The gasket 54 which has a circular configuration has a central web portion 56 which fits between and extends inwardly beyond the inner surfaces of the adjoining duct sections. This web portion is integral with an outer gasket portion 57 which extends from opposite sides of its outer end along the surface of each adjoining duct section. Thus, as shown, the outer gasket portion 57 extends well beyond the end of the novalak resin layer 40 and lies against the outer surface of the duct sections. The underside of the outer gasket portion 57 may be provided with a series of circular serrations 60 forming a plurality of contact points with the duct surface. As with previous embodiments, such as FIG. 1, the central gasket 54 is covered by a sleeve 30 with attached bands 32 each with a take-up device so that the sleeve can be made to compress firmly the gasket to provide a long-lasting leak proof duct connector.

After all four gasketing pieces are in place, the sheet metal sleeve 30 is wrapped around the joint. This sleeve tends to overlap at its ends somewhat to provide complete total encapsulation of the gasketing materials.

In order to hold these gaskets and sheet metal collar 30 in place, bands of steel 32 (preferably three) as previously described, may be placed around the exterior of the sheet metal collar. These band may by arranged with one band in the center of the joint, and one to either side of the center of the joint on top of the spacer gaskets 53 shown in FIG. 5.

Figures 7, 7A, 7B:
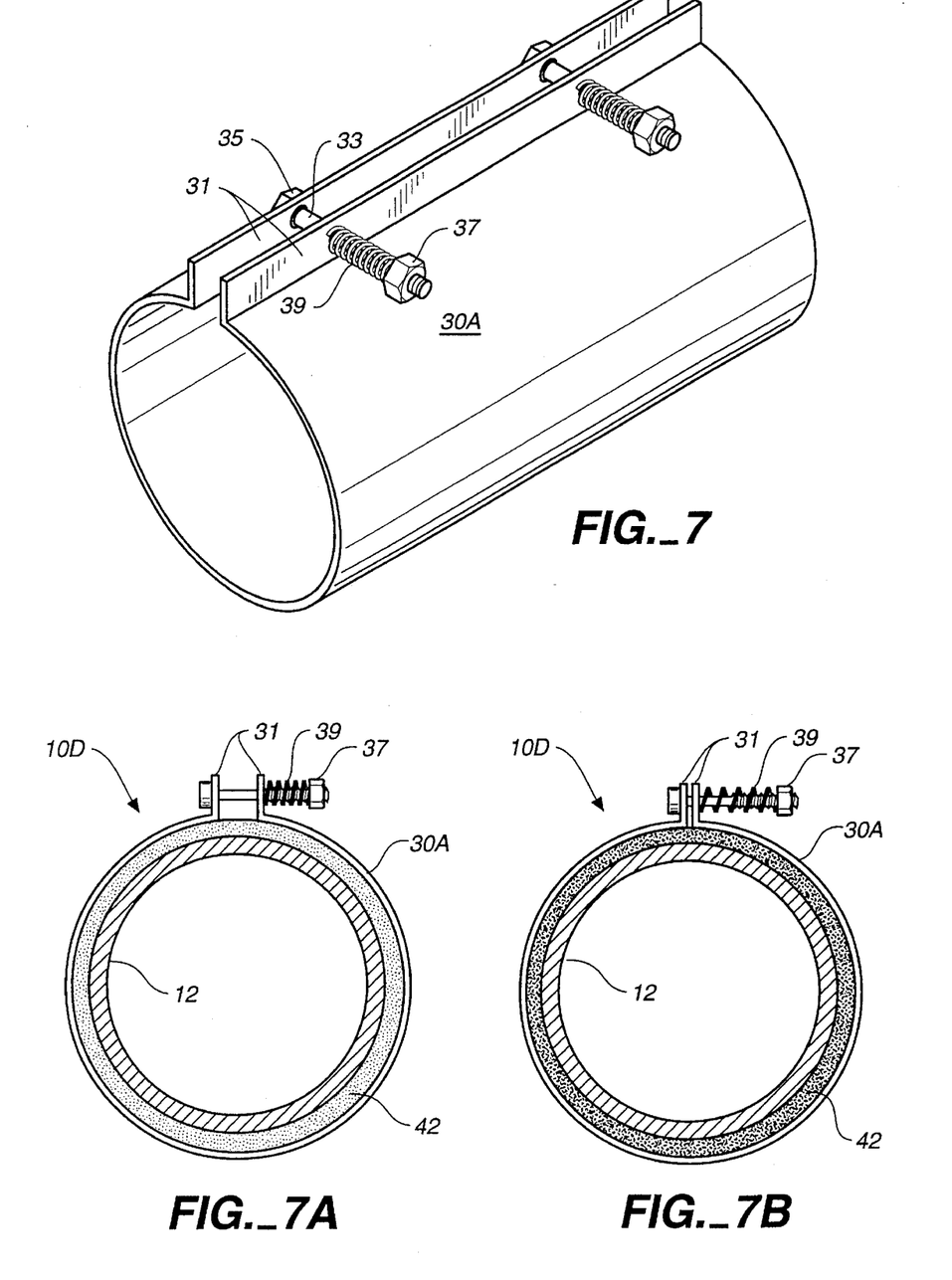
FIG. 7 is a view in perspective showing an alternate form of a self tightening sleeve for a mechanical joint according to the present invention.
FIG. 7A is a view in cross-section of a mechanical joint utilizing the sleeve of FIG. 8.
FIG. 7B is a view in cross-section showing the mechanical joint of FIG. 7A after it has automatically tightened around a duct as a result of gasket bulk shrinkage due to fire in the duct.

In another alternate form of joint 10D embodying principles of the inventions, a sheet metal sleeve 30A, as shown in FIG. 7 may be used which extends around the duct joint and has radially extending end flanges 31 that form lugs. These lugs are connected by a spring loaded bolt 33 which provide a self tightening function in the same manner as the constant torque clamp 36 as previously described. Here, a fixed head 35 at one outer end of each bolt bears against the outside of a first sleeve flange, the bolt extending through the other or second spaced apart flange. An adjustable nut 37 is provided at the other outer end of the bolt, and between this nut and the second flange is retained a spring 39 which is coiled around the bolt.

As shown in FIG. 7A when the joint connector 10E is initially installed with the various gaskets in place, as previously described, the spring 39 is compressed and the two end flanges 31 are normally spaced apart. If, as shown in FIG. 7B, the duct on which the joint connector 10E is installed, becomes overheated due to fire and tends to contract due to structural failure, the residual spring force will act to move the flanges 31 together and thereby tighten the sleeve on the duct joint to prevent it from slipping.

In the embodiments described, the materials used for the gasket must be made with a fire resistant compound. Preferably, the gaskets 16, 18, 26, 28, 42, 46, and 54 are made from a suitable synthetic rubber which is commercially available, such as chlorosulforated polyethylene, a material which is resistant to ozone and weather, heat and abrasion, as well as to many materials such as oils, solvents and chemicals that may have negative effects on the interior duct walls. Fire retardant additives should also be used in the gasket compounding, and these may consist of antimony oxide, aluminum trihydrate, dechlorane, polyphosphor salts, and the like.

Figure 8:
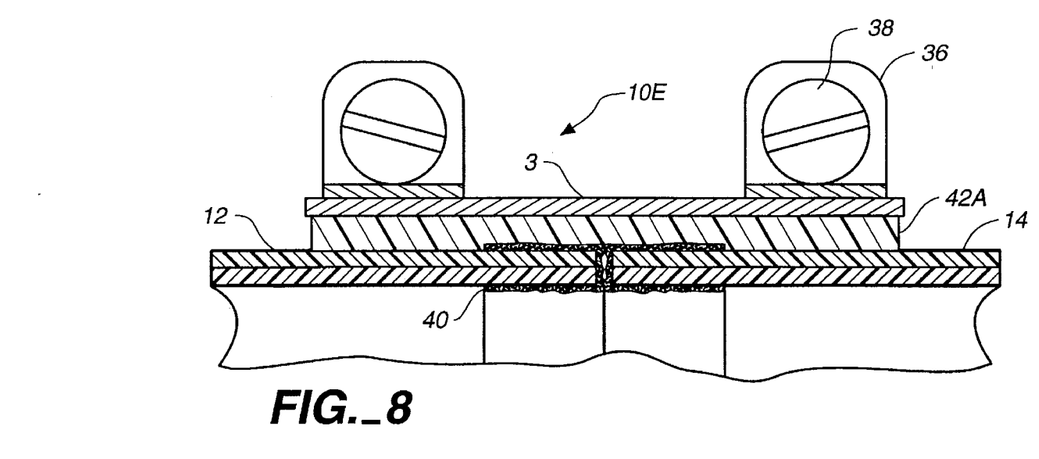
FIG. 8 is a fragmentary view in section showing a further modified form of the mechanical joint having a gasket member made of an intumescent material.

In a variation of the joint connector 10B, a modified joint connector 10E may be provided, as shown in FIG. 8. Here, a central circular gasket 42A is provided which is made of an intumescent material.

The gasket 42A may have the same dimensions and thickness as the gasket 42, but the intumescent material provides an additional feature in its reaction to heat. Here, when the gasket 42A is exposed to high heat, as in a duct fire, and starts to lose its bulk, the intumescent material in the gasket will cause it to expand, thereby helping to maintain pressure on the duct joint and thus structural integrity. With this embodiment, the constant torque take-up devices 36 need not be used in some instances, since the swelling of the intumescent gasket 42A may fully compensate for the decrease in diameter of the duct gasket due to fire.

As defined in Webster, "Intumescence is the foaming and swelling of a plastic or other material when exposed to high surface temperatures of flames." Various chemicals may be used to create gasket products that will intumesce. Their effect is to puff up combustion residues to create a tough insulating cellular foam which shields the product from the heat or flame. A combination of chemicals may be used, an important constituent being char formers, i.e. materials which contain a high percentage of carbon in their formula, such as sugars, polyhydric alcohols such as the trimer of pentaerythritol, starches or a polyhydric phenol such as resorcinol, or even carbon powders themselves. These char formers are used in conjunction with a dehydrating agent which is a Lewis acid. Generally phosphoric acid and its homologues such as ammonium and amine phosphates and phosphate esters are used. These constituents are introduced as a salt or ester in a form that decomposes on heating to produce acidic residues. As an alternate boron or phosphorous compounds may also be used as well as other intumescent materials. Blowing agents are used to create a foam and may be such chemicals as melamine, glycine, dicyandiamide, ureas, etc. Additional materials may also be added to toughen the foam, improve wetting, or reduce flaming characteristics. The exact internal quantities of each of the foregoing ingredients may vary widely, and effective formulations are arrived at only after great trial and error. A blowing agent for example, will be selected based on the specific polylol and dehydrating agent used.

The use of intumescent gasket materials in combination with the elements of the joint embodiments described including the constant torque type clamps 36 for maintaining sleeve tension on the duct provides a highly effective non-slipping duct joint as demonstrated by duct fire test arrangements described below.

Figure 9:
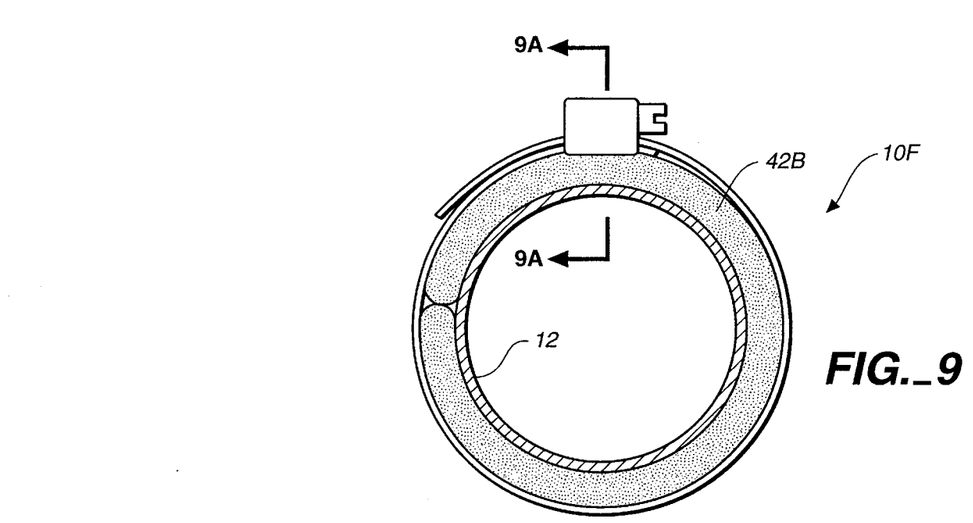
FIG. 9 is a view in elevation and in cross-section showing a duct joint utilizing an intumescent member according to the invention.
Figure 9A:
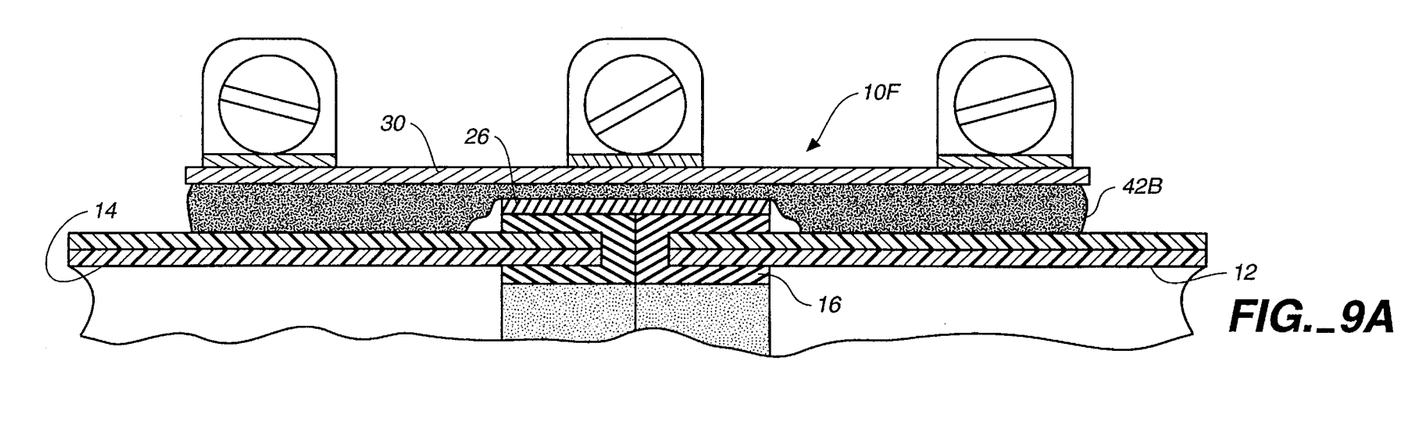
FIG. 9A is an enlarged fragmentary view in section taken along line 9A—9A of FIG. 9.

In a further modified joint 10F shown in FIGS. 9 and 9A, another intumescent mechanism in the form of a flexible bag 42B containing intumescent material is used. The bag itself may comprise an outer film of some flexible synthetic rubber or plastic material which surrounds and retains intumescent material in a semi-liquid or particulate form. As shown in FIG. 9A the bag 42B is utilized typically with a joint as previously described wherein end gaskets 16 are attached to abutting ends of duct sections 12 and 14. A circular rubber gasket extends around the end gaskets to cover the end gaskets 16 and seal any gap between them. Now, the flexible bag 42B of intumescent material is wrapped around the joint, extending well beyond opposite sides of the gasket 26. To hold the entire joint assembly in place, a metal sleeve is provided around the outside of the bag and is retained in place by metal bands each having a tightening clamp as previously described. When the joint 10F is used in a duct system, a fire in the duct will create a reactive swelling of the intumescent material and thereby serve to maintain structural integrity of the joint for a greater period of time.

Duct fires are not uncommon in various industries, and the use of plastic ducts is heavily regulated by building codes, fire codes, and insurance company standards. Virtually all of these standards require that a duct joint have fire resistance characteristics equal to the ductwork itself.

Figure 10:
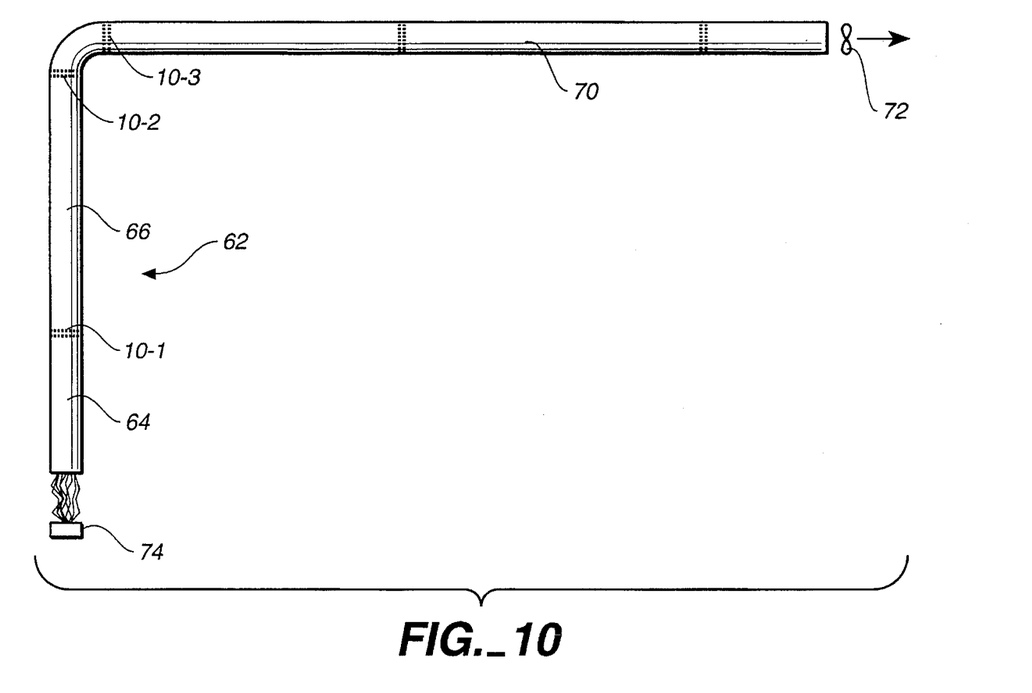
FIG. 10 is a view in elevation showing one type of a fire test arrangement for a mechanical duct joint according to the present invention.

One common test used in industry to determine this fire resistance is the Factory Mutual (FM) #4922 test that utilizes a vertical/horizontal test apparatus 62, which is shown in FIG. 10.

In this vertical/horizontal FM test a 12 inch round duct is used as a standard with a vertical duct section which is 15 feet high comprised on a lower duct section 64 that is five feet in length connected by a first joint 10-1 to an upper duct section 66 of ten feet in length. The upper vertical duct section is connected by a second joint 10-2 to one end of a 90° elbow 68 whose other end is connected by a third joint 10-3 to a 24 lineal feet section 70 of horizontal duct. This combined duct assembly is connected to an exhaust fan 72 which moves air at 600 fpm velocity inside the duct sections.

At the base of the vertical duct section 64, a one square foot pan of heptane 74 is put in place 24" below the inlet of the duct, and when ignited, provides a fire which releases around 10,000 BTU's a minute. The fire is drawn into the interior of the vertical duct by the action of the exhaust fan 72. The first joint 10A in the vertical duct section must occur no further than 5 feet from the level of the duct inlet. Invariably, in this test, the fire is sucked into the duct up to at least that height, if not higher. The second joint 10-2 occurs in the vertical duct at the elbow connection on the down side, and the third joint 10-3 is at the elbow connection where the elbow turns into the horizontal duct. There also must be subsequent horizontal duct joints at various points along the duct. The fire test is run for 15 minutes.

The problem with using conventional off-the-shelf non-fire retardant plasticized gasketing material was that the high heat of the fire (upwards to 1000° C.) caused commonly compounded gasketing materials to melt and become a liquid, which then functioned as a lubricant at the joint. When this occurred, the resulting lubrication effect caused the bottom vertical duct section to slide and the lowest duct section 64 to fall down. This was not considered satisfactory in order to pass the Factory Mutual test for smoke removal. Consequently, in the joint or coupling 10 of the present invention, a gasketing material as previously described must be used that preferably chars and retains the majority of its bulk under high heat or fire conditions within the duct. By proper compounding, selection of additives, and selection of the durometer (hardness) of the gasketing material, this was possible to achieve. Under severe fire conditions, if the gasketing material turns to ash, some bulk is lost, which makes the joint loose. The exterior diameter of the gasketing around the perimeter of the duct becomes reduced. Here, the normal compression pressure of the band straps 32, which had been used to cinch down gasketing materials would normally be lost. In the present invention the constant torque clamps 36 used in conjunction with the steel straps 32 serve to compensate for the loss in diameter (or perimeter) of the shrinking gasket materials by providing constant hoop tension to the assembly. When each joint or coupling 10 is installed, an initial tension is set in such a manner that should the tension of the holding straps be reduced, an automatic tightening action occurs which squeezes the assembly together. Thus, the combination of the constant torque clamp 36 and fire retardant non-shrinking gasketing materials for the various gaskets described synergistically provides a joint 10 that will not pull apart during the onslaught of an intense fire load.

Factory Mutual tests are expensive, costing approximately $15,000 each in 1985 dollars. To run a series of tests can be very costly. Yet one must ensure themselves that a product can pass the FM standard.

Figure 11:
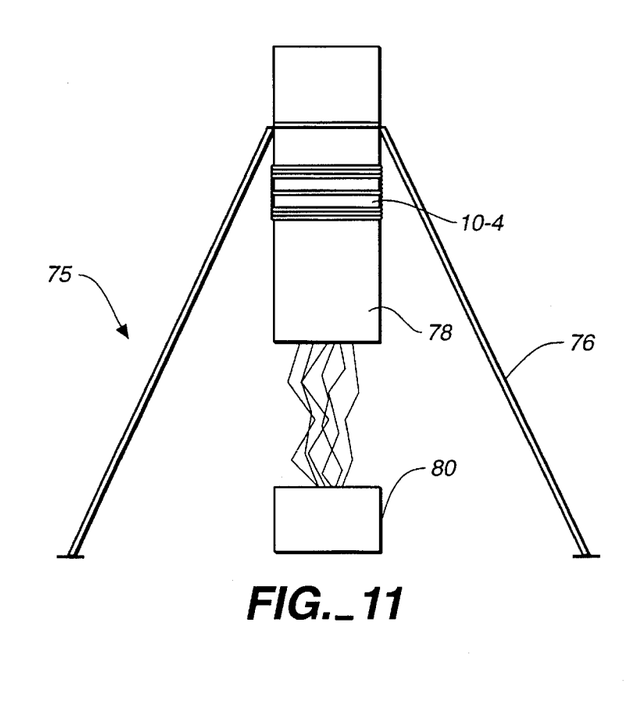
FIG. 11 is a view in elevation showing another fire test arrangement for a mechanical duct joint.

FIG. 11 shows another test arrangement 75 whereby fire screening tests were conducted to ensure that the "lubrication" or joint slipping problem was overcome. Here, a tripod arrangement comprised of supports 76 was used to hold an assembly comprised of a vertical duct section 78 having a joint 10-4 embodying principles of the invention and located five feet away from the inlet duct edge. A pan of heptane 80 was placed beneath this assembly, and a fire lit off. While no fan was used, the induced draft caused by the duct height was sufficient to cause flaming to reach the interior and sometimes, the exterior of the joint 10-4. The weight of the bottom section of the duct below the first joint 10-4 was the same construction as the joint 10-1 used in the Factory Mutual test 62.

Gasketing material for gasket components 16, 26 and 28 in the joint structure as shown in FIG. 2, was compounded with the additives of antimony oxide and dechlorane to provide fire-resistive gasketing material. A sheet metal collar 82 was encircled around the exterior of the joint. Three steel banding straps 32 were used, each of which were connected by constant torque worm gear drive clamps 36. The clamps were set with a torque wrench to specified values. The heptane fire was lit off, and the fire burned for 15 minutes. The joint assembly 10-4 did not fail. As the fire-resistant gasketing material volatilized from the high heat, it did shrink, however it retained most of its bulk. As the reduction in the gasket's diameter occurred, the constant torque clamp 36, as shown in FIGS. 1 and 2, kept squeezing down and re-tightening the exterior sheet metal collar 30 in proportion to the bulk loss of the gasketing material. This constant increasing compression from the "constant" torque clamp 36 compensated for the increased void of the "disappeared" gasket, and kept the joint assembly 10-4 tightly together. The "lubricant" phenomena did not occur so that the structural integrity of the duct at the joint 10-4 was maintained.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A mechanical device for connecting together two aligned fiberglass reinforced plastic duct sections, each having a terminal end portion of equal diameter, so as to form a leak proof joint that is resistant to fire and also to chemical corrosion from gases and/or condensate within the duct sections, said device comprising in combination:

end means comprising a layer of resin material and a pair of pre-formed end gasket members of flexible, fire-resistant, elastomeric material covering said resin material, each said end gasket member having a U-shaped cross section that fits over the end edge of a duct section for covering and sealing the duct surfaces at the terminal end portion of each said duct section;

a central gasket member covering said end means and extending around and over said terminal end portions of said duct sections;

a flexible metal sleeve member surrounding said central gasket member; and means for tightening said sleeve so as to compress said central gasket member and hold the aligned adjoining duct sections together to form said leak-proof joint.

2. The mechanical device as described in claim 1 wherein said resin material includes a thin layer of a novalak resin adhesive material between the inner surface of each said end gasket and the surface of said duct section at said terminal end portion.

3. The mechanical device as described in claim 2 wherein said layer of novalak resin has a thickness in the range of 0.08 to 0.12 inches.

4. The mechanical device as described in claim 1 including a spacer gasket of a fire retardant elastomeric material spaced from each end of said central gasket and providing a yieldable support under said metal sleeve.

5. The mechanical device as described in claim 1 wherein said central gasket has generally a "T" shape in cross section with a central web portion that fits between said terminal end portion of adjoining duct sections and an upper flange portion that is under said sleeve.

6. The mechanical device as described in claim 5 wherein said upper flange portions of said central gasket has serrated underside that contacts the surfaces of adjoining duct sections.

7. The mechanical device as described in claim 1 wherein said end gasket members are integral with said central gasket member so that said central gasket member is preformed with a general "T" shape in cross section, having a web portion that fits between end portions of adjoining duct sections and flange portions extending from opposite ends of said web portion that extend along the inner and outer surfaces of said terminal end portions of said duct section.

8. The mechanical device as described in claim 1 wherein said means for tightening said sleeve comprise a plurality of bands spaced apart along said sleeve, and take-up means at one end of each said band for receiving its opposite end around said sleeve and moving it forward so as to reduce the diameter of said band and thereby compress said sleeve against said central gasket.

9. The mechanical device as described in claim 8 wherein said take-up means includes a rotatable bolt for exerting a constant torque force that maintains compressive force on the adjoined duct sections even if they shrink in diameter due to heat.

10. The mechanical device as described in claim 1 wherein said sleeve member has radially extending flanges at opposite ends which are spaced apart when said sleeve is around the duct sections and said means for tightening said sleeve comprises bolt means extending through said flanges having a fixed head at one end and an adjustable nut at its other end, and a coiled spring around each said bolt member between one said flange and said adjustable nut, whereby said sleeve will automatically maintain a firm tension on the adjoining duct sections even when their diameter is diminished due to fire.

11. The mechanical device as described in claim 1 wherein said central gasket member contains an intumescent material which causes it to swell up and increase in volume in response to elevated temperature levels caused by fire within the duct sections.

12. The mechanical device as described in claim 11 wherein said central gasket member comprises a flexible bag having a relatively thin outer skin and enclosing a flowable quantity of intumescent material, said bag being held tightly by said sleeve member and tending to swell and increase in volume if the duct sections are partially consumed by fire, thereby serving to maintain the structural integrity of the duct joint.

13. A mechanical device for connecting together two aligned fiberglass reinforced plastic duct sections, each having a terminal end portion of equal diameter, so as to form a leak proof joint that is resistant to fire and also to chemical corrosion from gases and/or condensate within the duct sections, said device comprising in combination:

end means comprising a layer of resin material for covering and sealing the duct surfaces at a portion of the terminal end portion of each said duct section, wherein said end means comprises a pair of pre-formed end gasket members of flexible, fire resistant, elastomeric material, each said gasket end having a U-shaped cross section that fits over the terminal end portion of said duct sections;

a central gasket member covering said end means and extending around and over said terminal end portions of said duct sections when they are aligned and close together, said gasket containing an intumescent material which causes it to increase in volume due to an elevated temperature at the duct joint;

a flexible metal sleeve member surrounding said central gasket member; and means for tightening said sleeve so as to compress said central gasket member including self tightening, spring loaded means for automatically decreasing the diameter of said sleeve and thereby maintaining it tightly against said central gasket at abnormally elevated temperature levels so as to hold the aligned adjoining duct sections together to form said leak-proof joint and maintain its structural integrity during a fire condition within the duct sections.

14. The mechanical device as described in claim 13 wherein said end means includes a thin layer of a novalak resin adhesive material between the inner surface of each said end gasket and the surface of said duct section at said terminal end portion.

15. The mechanical device as described in claim 13 wherein said central gasket member comprises a flexible bag having a relatively thin outer skin and enclosing a flowable quantity of intumescent material, said bag being held tightly by said sleeve member and tending to swell and increase in volume if the duct sections are partially consumed by fire, thereby serving to maintain the structural integrity of the duct joint.

16. A method for connecting two tubular, aligned fiberglass reinforced plastic duct sections having annular terminal end portions, comprising the steps of:

covering the terminal end portions by coating them with a layer of protective novalak resin material;

aligning said duct sections so that said terminal end portions are substantially in abutment to form a joint;

providing a gasket means around said joint which extends longitudinally beyond said abutting terminal end portions;

wrapping a flexible sheet metal sleeve around said gasket means which extends longitudinally beyond the ends of said gasket means;

tightening said sleeve around said joint so as to compress said gasket means; and providing a means for causing said sleeve to maintain constantly its tightened position and thereby automatically decrease the diameter of said sleeve if the diameter of said duct sections should decrease due to a fire or high temperature condition within the duct.

17. The method as described in claim 16 wherein said gasket means comprises an elastomeric material having a percentage of intumescent material sufficient to cause the gasket means to swell and increase in volume during a high temperature condition in the duct so that structural integrity of the duct connection will be maintained.

18. A mechanical device for connecting together two aligned fiberglass reinforced plastic duct sections, each having a terminal end portion of equal diameter, so as to form a leak proof joint that is resistant to fire and also to chemical corrosion from gases and/or condensate within the duct sections, said device comprising in combination:

end means comprising a layer of resin material for covering and sealing the duct surfaces at a portion of the terminal end portion of each said duct section, wherein said end means comprises a layer of novalak resin combined with ceramic particles and covering said terminal end portions of said adjoining duct sections, said later having a thickness in the range of 0.08 to 0.12 inches;

a central gasket member covering said end means and extending around and over said terminal end portions of said duct sections when they are aligned and close together, said gasket containing an intumescent material which causes it to increase in volume due to an elevated temperature at the duct joint;

a flexible metal sleeve member surrounding said central gasket member; and means for tightening said sleeve so as to compress said central gasket member including self-tightening, spring loaded means for automatically decreasing the diameter of said sleeve and thereby maintaining it tightly against said central gasket at abnormally elevated temperature levels so as to hold the aligned adjoining duct sections together to form said leak-proof joint and maintain its structural integrity during a fire condition within the duct sections.

\* \* \* \* \*